(12) United States Patent
Gaudiano

(10) Patent No.: US 6,938,717 B2
(45) Date of Patent: Sep. 6, 2005

(54) ENGINE CONTROL TILT SWITCH FOR MOTORCYCLES

(76) Inventor: Dowon D. Gaudiano, 35 Olivehurst, Irvine, CA (US) 92602

( * ) Notice: Subject to any disclaimer, the term of this patent is extended or adjusted under 35 U.S.C. 154(b) by 273 days.

(21) Appl. No.: 10/465,283

(22) Filed: Jun. 20, 2003

(65) Prior Publication Data

US 2004/0256170 A1 Dec. 23, 2004

(51) Int. Cl.$^7$ .............................................. B60D 49/08
(52) U.S. Cl. ....................................................... 180/282
(58) Field of Search ................................. 180/282, 283

(56) References Cited

U.S. PATENT DOCUMENTS 6,423,914 B1 * 7/2002 Burnett ..................... 200/61.44
6,701,893 B2 * 3/2004 Isoda et al. ............. 123/406.25

* cited by examiner

*Primary Examiner*—Faye M. Fleming
(74) *Attorney, Agent, or Firm*—Morland C. Fischer

(57) ABSTRACT

A tilt switch to be carried by a motorcycle and connected in an engine control circuit to control the rotational speed of the motorcycle engine in response to the front end of the motorcycle lifting off the ground during rapid acceleration events (e.g. a "wheelie") to prevent the motorcycle from flipping over and causing injury or death to the operator and/or his passenger. Also connected in the engine control circuit is an on/off override switch that is located at the front of the motorcycle so as to be in easy reach of the operator. When the front wheel of the motorcycle is elevated with the override switch moved to the on position, the tilt switch will assume a closed switch condition to complete the engine control circuit. The engine control circuit then causes the engine speed of the motorcycle to slow such that the acceleration of the motorcycle will be correspondingly reduced, whereby the front wheel will automatically return to the ground to prevent the motorcycle from flipping over. With the override switch in the off position, the engine control circuit will be disabled regardless of the level of the motorcycle and the switch condition of the tilt switch carried thereby.

8 Claims, 5 Drawing Sheets

ENGINE CONTROL TILT SWITCH FOR MOTORCYCLES

BACKGROUND OF THE INVENTION

1. Field of the Invention

This invention relates to a tilt switch carried by a motorcycle and connected in an engine control circuit to control the operation of the motorcycle engine in response to the front end of the motorcycle being lifted off the ground during rapid or sudden acceleration events to prevent the motorcycle from flipping over and causing injury or death to the operator and/or his passenger.

2. Background Art

Motorcycles are motor vehicles that are capable of being rapidly accelerated by their operators. Occasionally, such rapid acceleration may cause the front wheel of the motorcycle to lift off the ground (commonly known as a "wheelie"). If the motorcycle continues to accelerate with the front end thereof lifted up, it is possible that the motorcycle will flip over and land on top of the operator and/or his passenger so as to result in serious injury or even death.

Accordingly, it would be desirable to have available a reliable, low cost and easy to use means to be carried by the motorcycle to limit the elevation of the front wheel above the ground during a wheelie so as to avoid a flip-over. Moreover, it is further desirable that such flip-over prevention means be attached to the motorcycle without requiring any changes to the original construction thereof.

Examples of devices which are responsive to the level of a motorcycle traveling over a roadway are available by referring to either one of the following published patent applications:

| U.S. Pat. No. 20020063047 | Burnett | May 30, 2002 |
| U.S. Pat. No. 20020039951 | Hasegawa | Apr. 14, 2002 |

SUMMARY OF THE INVENTION

In general terms, a reliable, low cost and easy to use engine control tilt switch is disclosed to be carried by a motorcycle and adapted to control the operation of the motorcycle engine in response to the front end of the motorcycle lifting up during a rapid acceleration (i.e. a wheelie). The engine control tilt switch is attached to the motorcycle at a suitable location (e.g. behind the passenger foot peg at the rear of the motorcycle). The tilt switch includes a glass vial having front and rear chambers, a pair of switch contacts extending into the rear chamber, and a supply of mercury stored in the front chamber.

The motor control tilt switch is part of a motor control circuit including an on/off override switch and means by which to control the rotational speed of the motorcycle engine. The override switch is mounted at an accessible location in easy reach of the operator (e.g. at the front of the motorcycle on the triple clamp adjacent the control panel). With the override switch moved to the on position, the motor control circuit is adapted to temporarily activate either one of the engine rev limiter (whereby to disable one or more cylinders of the motorcycle engine) or the engine kill switch (whereby to disable the engine).

With the motorcycle traveling at normal operating speed and each of the front and rear wheels in contact with the ground, the supply of mercury will remain in the front chamber of the vial of the engine control tilt switch. Accordingly, the switch contacts in the rear chamber are disconnected from one another whereby the tilt switch has an open switch condition and the motor control circuit is disabled. However, prior to the time that the motorcycle will be rapidly accelerated, the operator moves the on/off override switch to the on position. As the motorcycle is accelerated and the front wheel lifts off the ground, the supply of mercury will flow from the front chamber of the vial of the engine control tilt switch into the rear chamber. Accordingly, the switch contacts in the rear chamber will now be electrically connected to one another to cause the tilt switch to assume a closed switch condition such that the motor control circuit will be enabled. Thus, either the engine rev limiter or the engine kill switch is activated to cause the speed of the motorcycle engine to be reduced, whereby the acceleration of the motorcycle is correspondingly slowed and the front wheel is automatically lowered back to the ground. By virtue of the foregoing, the motorcycle will be less likely to flip over in the event it is rapidly accelerated during which time the operator performs a wheelie and the front end of the motorcycle is raised off the ground.

DETAILED DESCRIPTION

Figure 1:
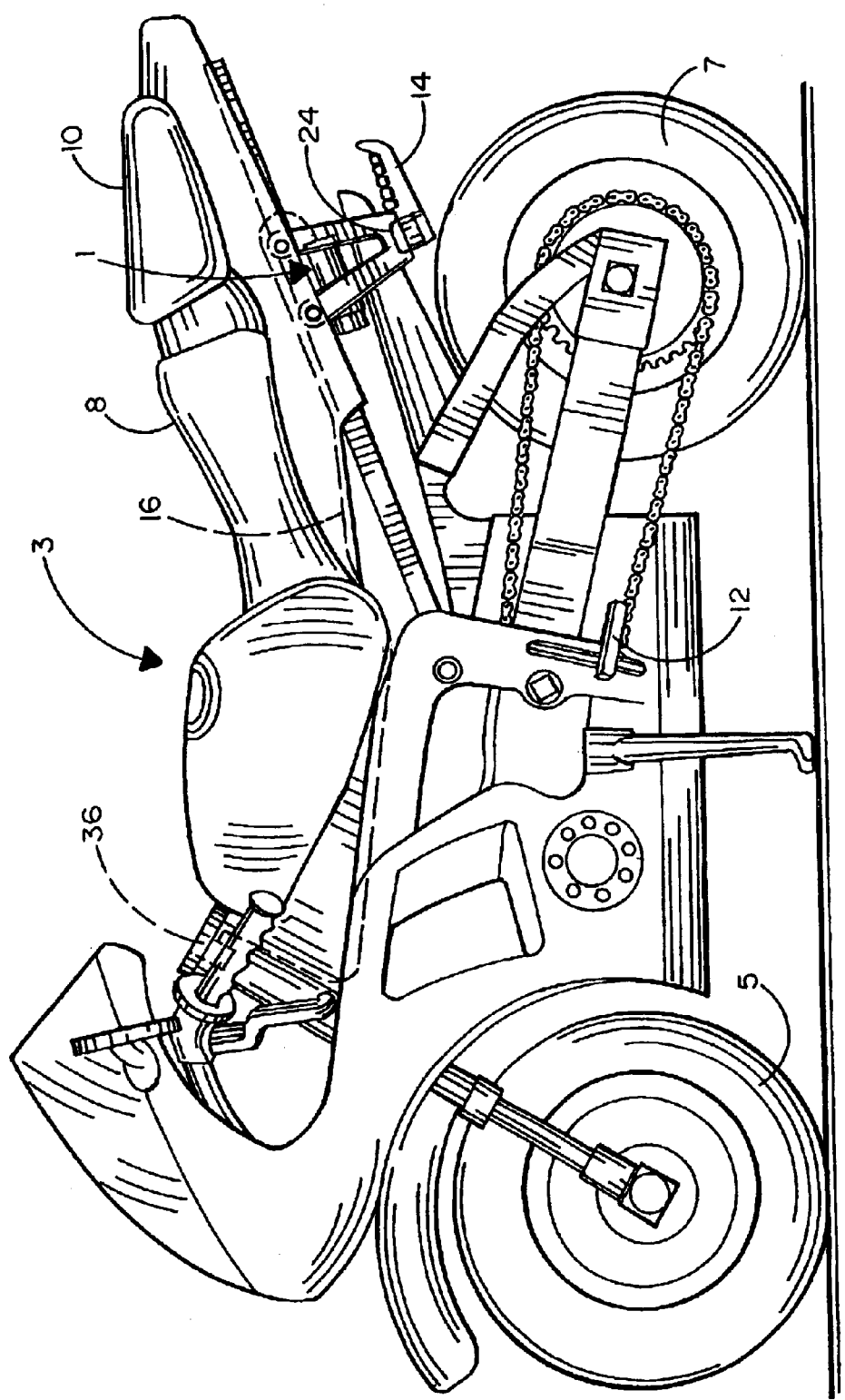
FIG. 1 shows a motorcycle carrying the engine control tilt switch of this invention.

FIG. 1 of the drawings shows the engine control tilt switch 1 carried by a motorcycle 3 to achieve the benefits of the present invention. It is to be understood that the engine control tilt switch 1 to be described in greater detail hereinafter can be used with any motorcycle, and the particular motorcycle 3 that is illustrated in the drawings is not to be considered a limitation of this invention. The motorcycle 3 to which tilt switch 1 is applicable has front and back wheels 5 and 7, operator and passenger seats 8 and 10, and the usual front and rear foot pegs 12 and 14 to support the feet of the operator and his passenger.

As will soon be explained, the engine control tilt switch 1 of this invention provides a simple, reliable and low cost means to prevent the front wheel 5 of the motorcycle 3 from lifting off the ground to an excessive elevation where the motorcycle might flip over and cause serious injury or even death to the operator and/or his passenger. In other words, the tilt switch 1 of this invention is intended to offset the effects of a "wheelie" by limiting the ability of the front wheel 5 to lift too far off the ground in response to a sudden or rapid acceleration of the motorcycle 3.

In a preferred embodiment, the engine control tilt switch 1 is carried by the motorcycle 3 at any suitable location where it will not be susceptible to damage such as, for example, at the rear of the motorcycle below the passenger seat 10 and behind the passenger foot peg 14. A pair of electrical wires 16 (shown in broken lines in FIG. 1) extend between the tilt switch 1 at the rear of motorcycle 3 and an on/off override switch 36 (best shown in FIGS. 3 and 5) that is mounted at the front of motorcycle 3.

Figure 2:
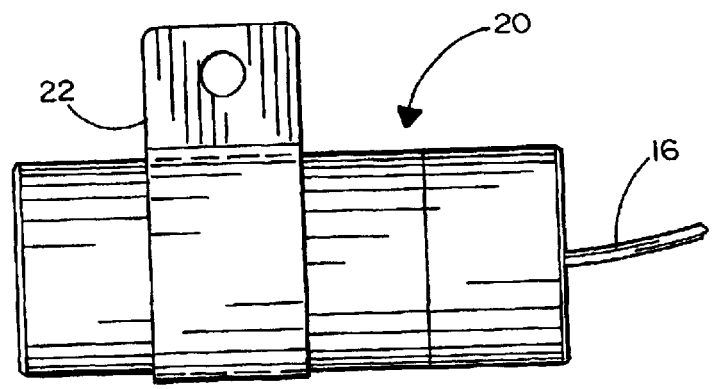
FIG. 2 shows the engine control tilt switch surrounded by an outer casing having a mounting ring by which the tilt switch is attached to the motorcycle as shown in FIG. 1.

Referring concurrently to FIGS. 2 and 3 of the drawings, details are provided of the engine control tilt switch 1 that is responsive to the elevation of the front end of the motorcycle 3 to prevent the motorcycle from flipping over at those times when the operator intentionally or accidentally performs a wheelie. Tilt switches that are appropriate for use in this application are commercially available and, therefore, only a brief description of the tilt switch 1 will be provided below. By way of particular example, one suitable tilt switch to be used herein is a mercury tilt switch that is manufactured by Comus International of Clifton, N.J. as Part No. CK-30.

The engine control tilt switch 1 shown in FIG. 2 is enclosed by an outer protective casing 20. A foam packing 21 surrounds the tilt switch 1 within the outer casing 20. A mounting ring 22 surrounds casing 20 to enable the tilt switch 1 to be attached to the rear of the motorcycle (such as at the existing bracket 24 shown in FIG. 1 to which the passenger foot peg 14 is connected). In this regard, it may be appreciated that the engine control tilt switch 1 is coupled to motorcycle 3 without requiring any changes to the original construction of the motorcycle. Wires 16-1 and 16-2 extend through the outer casing 20 by which to connect the tilt switch 1 in an engine control circuit (designated 40 in FIG. 3A) so that the rotational speed of the engine can be controlled depending upon the elevation of the front end of motorcycle 3 relative to the ground.

Figure 3A:
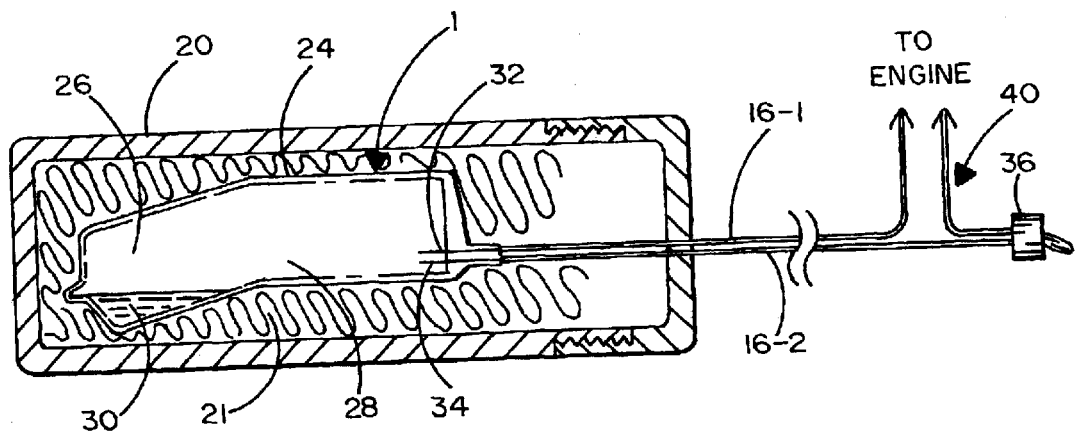
FIG. 3A shows the engine control tilt switch interconnected within an engine control circuit of the motorcycle.

As shown in FIG. 3A, the engine control tilt switch 1 includes a hollow glass vial 24 that is suspended at the interior of the outer casing 20. The vial 24 is shown having front and rear chambers 26 and 28 that are angled relative to one another. A supply of mercury 30 or any other suitable electrically conductive liquid is carried within the hollow vial 24. First ends of a pair of electrical switch contacts 32 and 34 are separated from one another at the interior of the vial 24 at the rear chamber 28 thereof. The opposite ends of switch contacts 32 and 34 are connected to respective electrical wires 16-1 and 16-2. The electrical wires 16-1 and 16-2 complete the aforementioned engine control circuit 40 so that the tilt switch 1 and the on/off override switch 36 are connected in electrical series with one another to control the operation of the motorcycle engine in a manner that will soon be disclosed.

In the uninstalled orientation of the engine control tilt switch 1 shown in FIG. 3A, the supply of mercury 30 is collected within the front chamber 26 of vial 24, whereby the rear chamber 28 is empty and the pair of switch contacts 32 and 34 are disconnected from one another. Therefore, the tilt switch 1 is normally open and the engine control circuit 40 will be disabled.

Figure 3B:
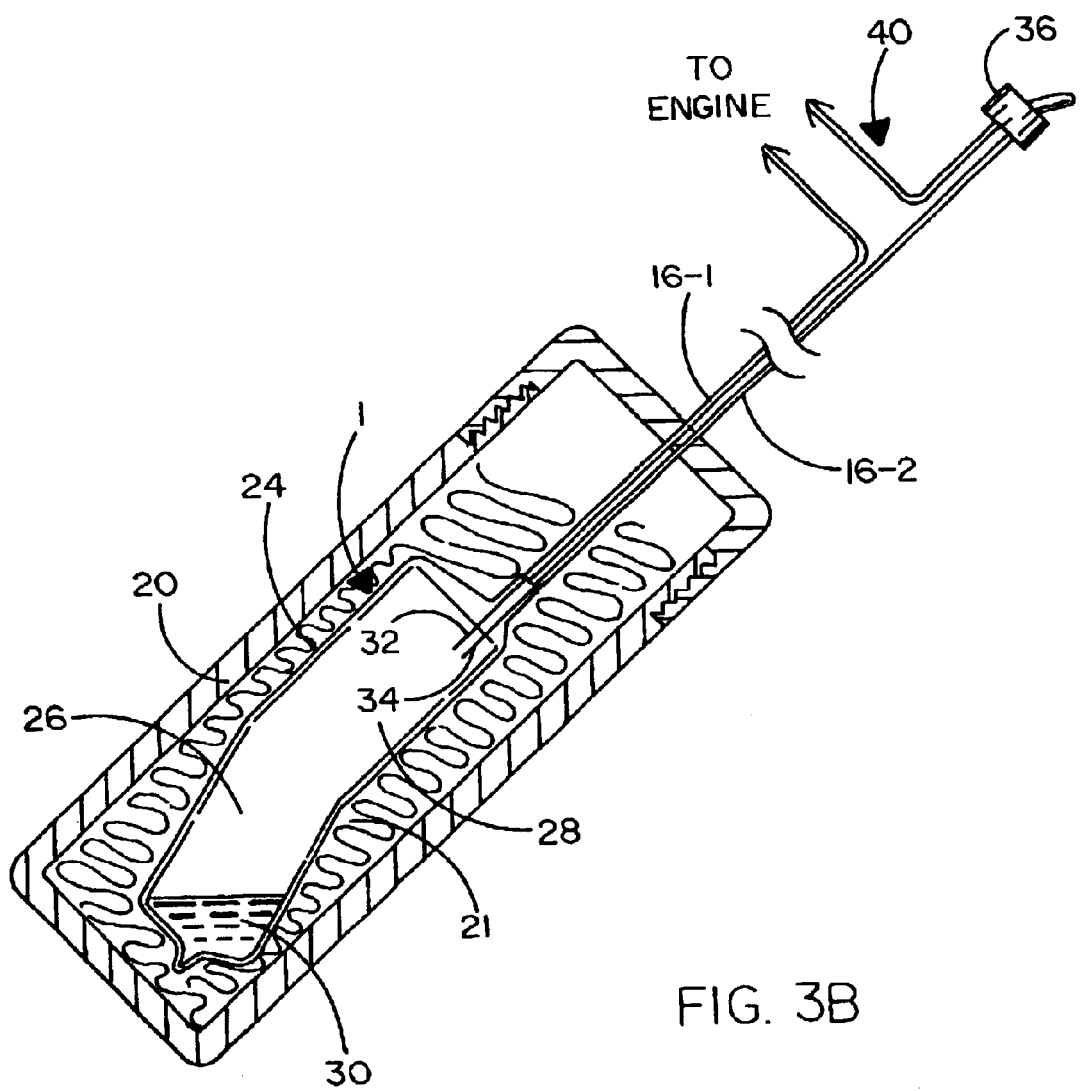
FIG. 3B shows the motor control tilt switch oriented in the open switch condition when attached to a motorcycle having both its front and rear wheels against the ground.
Figure 3C:
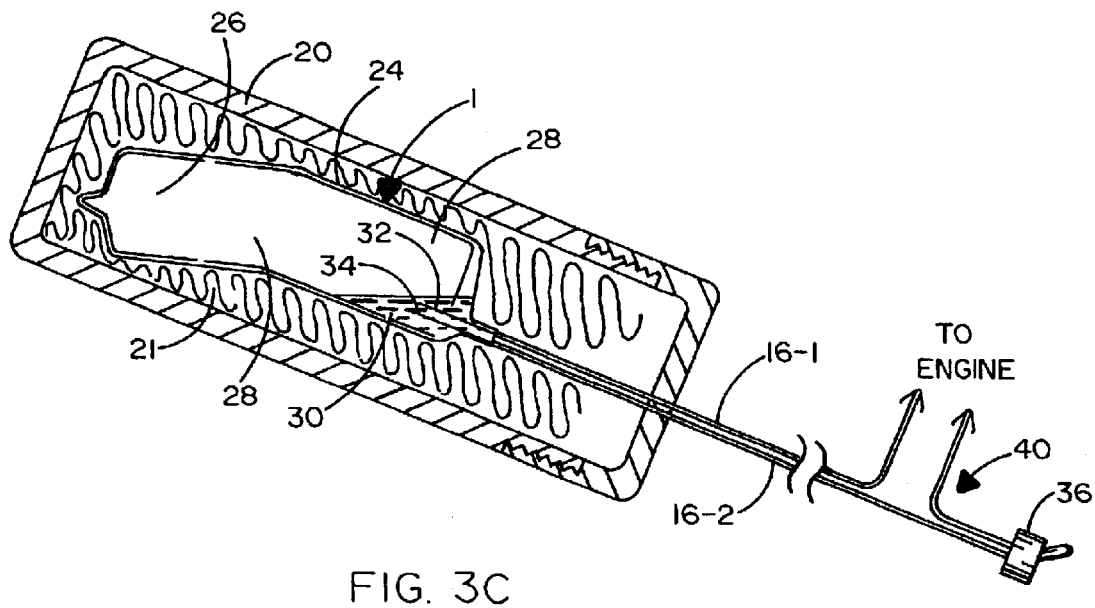
FIG. 3C shows the engine control tilt switch oriented in the closed switch condition when attached to a motorcycle having its front wheel lifted off the ground.

With the engine control tilt switch 1 carried by a motorcycle 3 having both its front and rear wheels 5 and 7 on the ground, the tilt switch 1 will be in the at the rest orientation illustrated in FIG. 3B where the front chamber 26 of vial 24 is lower than the rear chamber 28. That is to say, with the motorcycle 1 either stationery or traveling at normal cruising speed along a roadway with little incline so that the front and rear wheels 5 and 7 roll along the ground, the supply of mercury 30 remains collected within the front chamber 26 of vial 24. The rear chamber 28 of the vial 24 is still empty and the pair of switch contacts 32 and 34 projecting therewithin continue to be disconnected from one another. Therefore, the tilt switch 1 stays open, and regardless of the position of the override switch 36, the engine control circuit 40 will be disabled.

Figure 4:
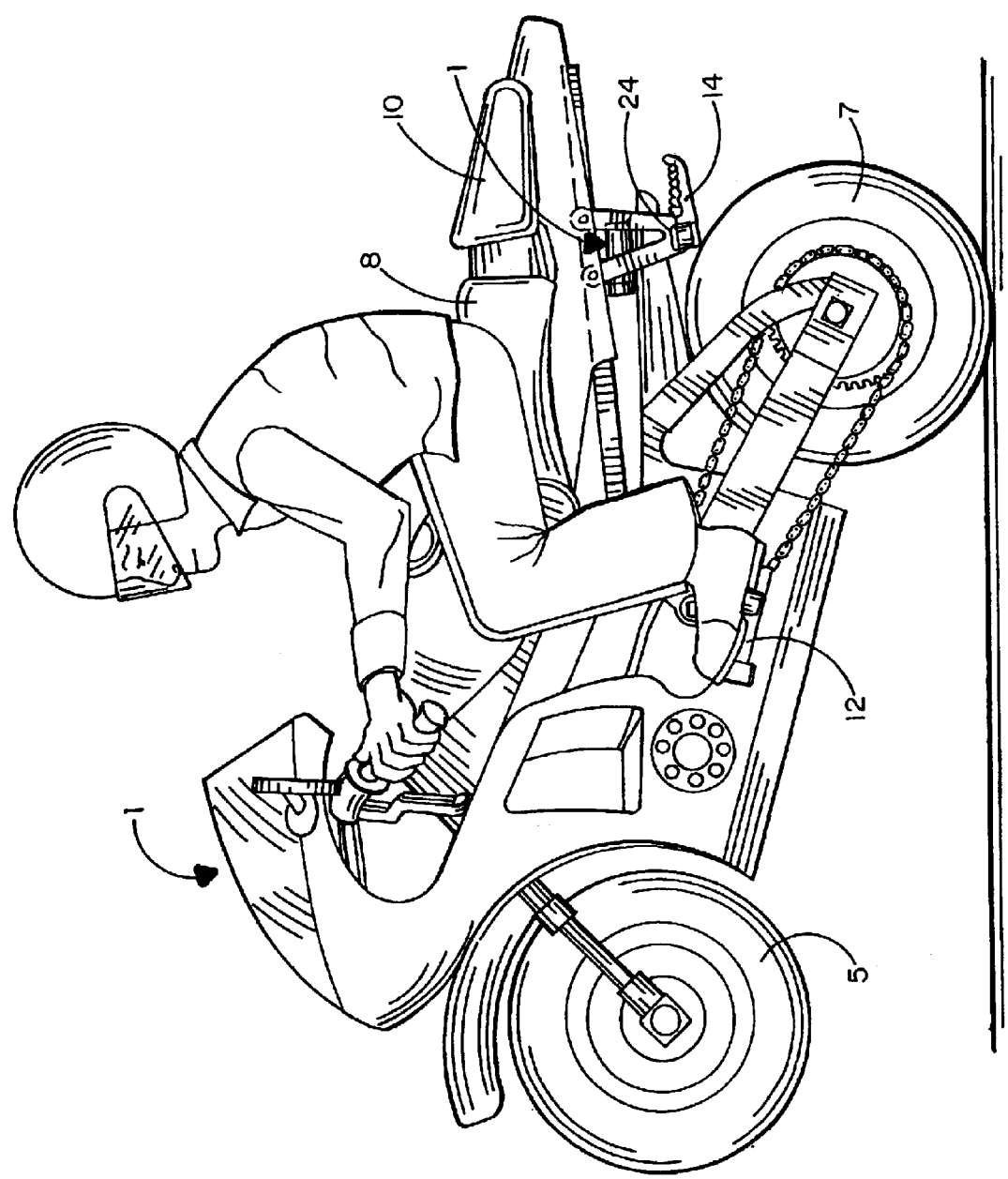
FIG. 4 shows the motorcycle of FIG. 1 with its front wheel lifted off the ground to cause the engine control tilt switch to be oriented in the closed switch condition of FIG. 3C.

However, prior to those times when the front wheel 5 of the motorcycle 1 will be lifted off the ground (e.g. during a wheelie), the operator may first want to actuate the engine control circuit 40 so as to prevent the elevation of the front end to a dangerous height and thereby avoid the possibility that his motorcycle will flip over during sudden or rapid acceleration. In this case, and turning to FIGS. 3C and 4 of the drawings, the on/off override switch 36 of circuit 40 is now moved to the on position. When the front end of the motorcycle 3 has been raised off the ground as shown in FIG. 4, the tilt switch 1 will now be oriented in the active configuration shown in FIG. 3C where the front chamber 26 of vial 24 is higher than the rear chamber 28 so that the supply of mercury 30 flows, under the influence of gravity, out of the front chamber 26 and into the rear chamber 28. The pair of switch contacts 32 and 34 projecting into the rear chamber 28 are now electrically connected to one another, whereby the tilt switch 1 is closed and the engine control circuit 40 within which the override switch 26 is connected will be enabled.

In a preferred embodiment, with the engine control tilt switch 1 closed and the override switch 36 in the on position, the motor control circuit 40 is adapted to activate the standard rev limiter (not shown) of the motorcycle. As will be known to those skilled in the art, the rev limiter functions as a governor by temporarily disabling a pair of cylinders to thereby limit the rotational speed of the engine. With the engine control circuit 40 completed, the rev limiter will be connected as if the engine had exceeded its red line limit, whereby the cylinders are disabled as would normally occur while operating at a very high rpm to avoid engine damage. In an alternate embodiment, the engine control circuit 40 is adapted to activate the engine kill switch (also not shown). In this case, the kill switch momentarily disables the engine of the motorcycle.

Whether it is the rev limiter or the kill switch that is activated via engine control circuit 40, the speed of the engine is automatically reduced and the acceleration of the motorcycle is correspondingly decreased so as to cause the raised front end to automatically return to the roadway. With both wheels 5 and 7 once again riding along the ground, the engine control tilt switch 1 is returned to the at rest orientation shown in FIG. 3B. Accordingly, the mercury 30 flows back into the front chamber 26 of vial 24, the electrical switch contacts 32 and 34 within the rear chamber 28 are once again disconnected from one another, and the motor control circuit 40 is thereby disabled such that the engine of the motorcycle 3 will no longer be influenced by the engine control circuit 40. The operator may now return the override switch 36 to the off position until the next time that he is ready to initiate a rapid acceleration of sufficient magnitude to cause the front end of his motorcycle 3 to lift off the ground.

Figure 5:
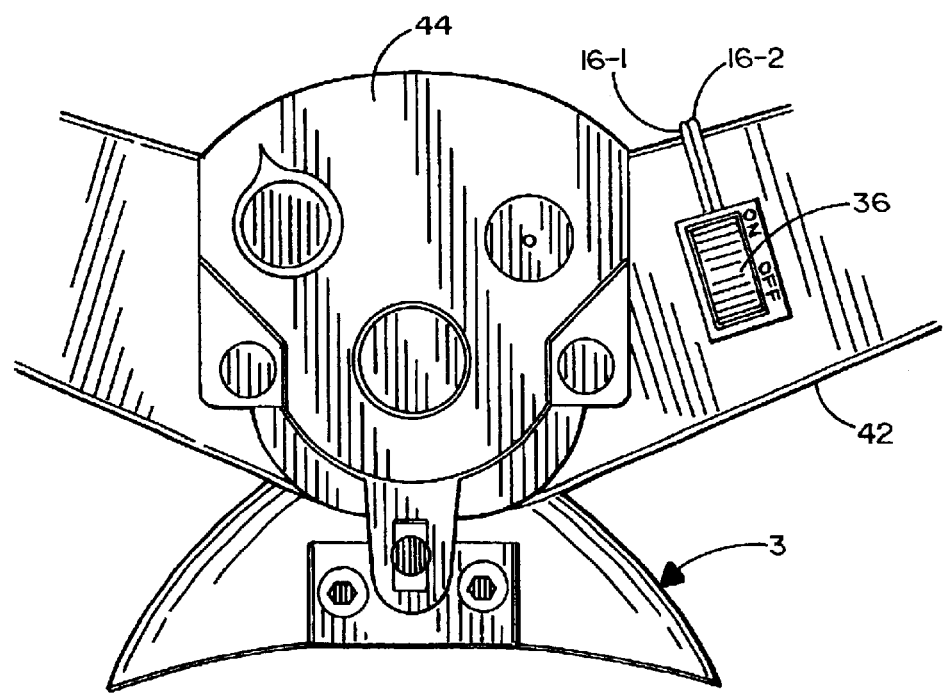
FIG. 5 shows an on/off override switch carried at the front of the motorcycle and interconnected in the engine control circuit with the engine control tilt switch of FIG. 3A.

FIG. 5 of the drawings shows the on/off override switch 36 located at a convenient position at the front of the motorcycle 3 so as to be in easy reach of the operator. In the example of FIG. 5, the override switch 36 is mounted on the triple clamp 42 adjacent the motorcycle steering damper 44. The override switch 36 is maintained in the off position (whereby to disable the engine control circuit 40 of FIG. 3) at those times when the motorcycle is approaching a steep hill or operating at normal cruising speeds on a horizontal roadway. The override switch 36 is moved to the on position (whereby to enable the engine control circuit 40) at those times when the motorcycle 3 will be rapidly accelerated to cause the front end thereof to become elevated. However, by virtue of the fact that the engine control tilt switch 1 will close instantaneously as the front wheel 5 lifts off the ground, the front wheel 5 will quickly fall back to the ground to prevent the motorcycle 3 from flipping over during a wheelie.

The engine control tilt switch 1 of this invention can be initialized at the time it is attached to the motorcycle 3. That is, by adjusting the initial orientation of the tilt switch 1 relative to the ground, it will be possible to select a particular elevation of the front wheel 1 at which to cause the tilt switch 1 to close and the engine control circuit 40 to be enabled. Accordingly, the engine control tilt switch 1 herein described provides the operator with the flexibility of being able to lift the front end of his motorcycle a predetermined distance off the ground without affecting the operation of his engine. What is more, with the on/off override switch 36 in the off position, the motorcycle can be driven up steep hills without affecting the operation of the engine, despite the fact that tilt switch 1 may be closed.

I claim:

1. For use on a motor vehicle having front and rear wheels,
   a level detector that is responsive to the elevation of the front wheel of the motor vehicle off the ground; and
   an electrical engine control circuit within which said level detector is connected to control the operation of the engine of the motor vehicle,
   said level detector having an open circuit condition by which to disable said electrical engine control circuit when each of the front and rear wheels of the motor vehicle is in contact with the ground, and said level detector having a closed circuit condition by which to complete said electrical engine control circuit when the front wheel of the motor vehicle is lifted above the ground during an acceleration for causing the engine speed of the motor vehicle to slow and the acceleration of the motor vehicle to be correspondingly reduced, whereby the front wheel of the motor vehicle will return to the ground to prevent the motor vehicle from flipping over.

2. The level detector and engine control circuit recited in claim 1, wherein the motor vehicle on which said level detector and circuit are used is a motorcycle.

3. The level detector and engine control circuit recited in claim 1, wherein said level detector is a tilt switch.

4. The level detector and engine control circuit recited in claim 3, wherein said tilt switch includes a pair of spaced switch contacts and an electrically conductive liquid, said tilt switch having said open circuit condition by which to disable said engine control circuit when the electrically conductive liquid is isolated from said pair of switch contacts and said pair of switch contacts are disconnected from one another, and said tilt switch having said closed circuit condition by which to complete said engine control circuit when said pair of switch contacts are immersed in the electrically conductive liquid and said switch contacts are thereby electrically connected to one another.

5. The level detector and engine control circuit recited in claim 1, wherein said engine control circuit also includes an on/off override switch connected in electrical series with said level detector, said override switch being placed in an on position to complete said engine control circuit when said level detector has said closed circuit condition, and said override switch being placed in an off position to disable said engine control circuit regardless of whether said level detector has said open or said closed circuit condition.

6. The level detector and engine control circuit recited in claim 5, wherein said level detector is attached to the rear of the motor vehicle, and said on/off override switch is attached to the front of the motor vehicle at a location so as to lie in easy reach of the operator, said motor control circuit also including electrical wires running between the front and rear of the motor vehicle by which to connect said level detector to said override switch.

7. In combination:
   a motorcycle having front and rear wheels, and
   a tilt switch connected in an electrical engine control circuit to control the speed of the engine of the motorcycle, said tilt switch carried by the motorcycle so as to have an open switch condition by which to disable said engine control circuit when each of the front and rear wheels of the motorcycle is in contact with the ground and a closed switch condition by which to complete said engine control circuit when the front wheel of the motorcycle is elevated above the ground during acceleration for causing the engine speed of the motorcycle to slow and the acceleration of the motorcycle to be correspondingly reduced, whereby the front wheel will return to the ground to prevent the motorcycle from flipping over.

8. The combination recited in claim 7, also including an on/off override switch connected in said engine control circuit in electrical series with said tilt switch, said override switch being placed in an on position to complete said engine control circuit when said tilt switch has said closed switch condition, and said override switch being placed in an off position to disable said engine control circuit regardless of whether said tilt switch has said open or said closed switch condition.

* * * * *